US008240120B2

(12) United States Patent
Southwick et al.

(10) Patent No.: US 8,240,120 B2
(45) Date of Patent: Aug. 14, 2012

(54) VIBRATION MANAGEMENT FOR GAS TURBINE ENGINES

(75) Inventors: Robert D. Southwick, S. Glastonbury, CT (US); Joseph P. Pascuitti, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 1316 days.

(21) Appl. No.: 11/923,897

(22) Filed: Oct. 25, 2007

(65) Prior Publication Data

US 2009/0110541 A1    Apr. 30, 2009

(51) Int. Cl.
*F02G 3/00* (2006.01)

(52) U.S. Cl. ...................... 60/39.091; 60/779

(58) Field of Classification Search ............ 60/39.091, 60/39.281, 779, 793, 204, 223, 803, 771, 60/773
See application file for complete search history.

(56) References Cited

U.S. PATENT DOCUMENTS

| | | | |
|---|---|---|---|
| 4,581,888 A * | 4/1986 | Schmitzer et al. ......... | 60/39.091 |
| 5,540,547 A | 7/1996 | Cole | |
| 5,541,857 A * | 7/1996 | Walter et al. ................ | 700/280 |
| 5,809,843 A | 9/1998 | Barger et al. | |
| 5,820,348 A | 10/1998 | Fricke | |
| 5,961,067 A | 10/1999 | Hall et al. | |
| 6,055,805 A * | 5/2000 | El-Aini et al. .............. | 60/226.1 |
| 6,224,341 B1 | 5/2001 | Fricke | |
| 6,712,314 B2 | 3/2004 | Stephan | |
| 6,751,602 B2 | 6/2004 | Kotoulas et al. | |
| 2002/0162317 A1 | 11/2002 | Banaszuk et al. | |
| 2003/0077163 A1 | 4/2003 | Eveker et al. | |
| 2004/0145251 A1 | 7/2004 | Clouse et al. | |
| 2005/0039437 A1* | 2/2005 | Lair ............................ | 60/204 |
| 2006/0120875 A1 | 6/2006 | Surace et al. | |
| 2007/0245708 A1* | 10/2007 | Southwick ................. | 60/39.091 |

* cited by examiner

*Primary Examiner* — Ehud Gartenberg
*Assistant Examiner* — Andrew Nguyen
(74) *Attorney, Agent, or Firm* — Carlson Gaskey & Olds, P.C.

(57) ABSTRACT

Systems and methods involving vibration management of gas turbine engines are provided. In this regard, a representative method includes: detecting vibrations of a gas turbine engine; automatically adjusting rotational speed of a component of the gas turbine engine in order to attempt to reduce the vibrations to within predefined vibration limits; and automatically adjusting operating parameters of the gas turbine engine such that, if the vibrations are reduced to within the predefined vibration limits, thrust of the gas turbine engine is set to an amount of thrust corresponding to the amount of thrust provided prior to the adjusting of the rotational speed of the component.

17 Claims, 3 Drawing Sheets

VIBRATION MANAGEMENT FOR GAS TURBINE ENGINES

BACKGROUND

1. Technical Field

This disclosure generally relates to gas turbine engines.

2. Description of the Related Art

There are various factors that influence the operating life of gas turbine engine components. By way of example, the environment in which a gas turbine engine operates can have a significant impact. For instance, a salt-rich environment, such as experienced during transoceanic flights, can result in increased oxidation of components.

In contrast to environmental factors, other factors that influence the operating life of a gas turbine can be internal to the gas turbine. By way of example, vibrating gas turbine engine components can cause high cycle fatigue (HCF). That is, rotating components such as bearings, shafts and rotor assemblies (including gearboxes) can experience excessive frequency-related loading during periods of abnormally high vibration that tends to reduce the operating life of these components. High vibration levels are typically symptoms of a problem, whether it be damage or a design issue, and often occur over a limited rotor speed range. Some levels of vibration that produce damage are not detectable by the pilot, thus prolonging exposure to high cycle fatigue conditions that could reduce engine life. Vibration-induced HCF results in high system loads and stresses for both static and rotating engine components that could lead to premature component failures with potentially costly secondary damage (also a safety of flight issue).

SUMMARY

Systems and methods involving vibration management of gas turbine engines are provided. In this regard, an exemplary embodiment of such a method comprises: detecting vibrations of a gas turbine engine; automatically adjusting rotational speed of a component of the gas turbine engine in order to attempt to reduce the vibrations to within predefined vibration limits; and automatically adjusting operating parameters of the gas turbine engine such that, if the vibrations are reduced to within the predefined vibration limits, thrust of the gas turbine engine is set to an amount of thrust corresponding to the amount of thrust provided prior to the adjusting of the rotational speed of the component.

An exemplary embodiment of a gas turbine engine comprises: a vibration sensor operative to provide information corresponding to a sensed vibration of the gas turbine engine; and a vibration management system operative to receive the information from the vibration sensor such that, responsive to determining that vibrations exceed predefined vibration limits, the vibration management system is operative to alter rotational speed of a component of the gas turbine engine in order to reduce the vibrations to within the predefined vibration limits.

An exemplary embodiment of an electronic engine control for a gas turbine engine comprises a vibration management module operative to: receive information corresponding to vibrations of a gas turbine engine; determine, from the information, whether the vibrations of the gas turbine exceed predefined vibration limits; and responsive to determining that the vibrations exceed the predefined vibration limits, provide an output for altering rotational speed of a component of the gas turbine engine in order to reduce the vibrations to within the predefined vibration limits.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods involving vibration management of gas turbine engines are provided. In this regard, several exemplary embodiments will be described. In some embodiments, vibration of a gas turbine engine is monitored at one or more locations in order to determine whether vibrations are within acceptable limits. Typically, the vibrations can be attributed to one or more rotating components of the gas turbine engine. Thus, if it is determined that vibrations of the engine are not within predefined vibration limits, rotational speed of a component can be automatically adjusted. In this manner, vibrations, which can potentially lead to a decrease in operating life of the gas turbine engine, can be reduced.

Figure 1:
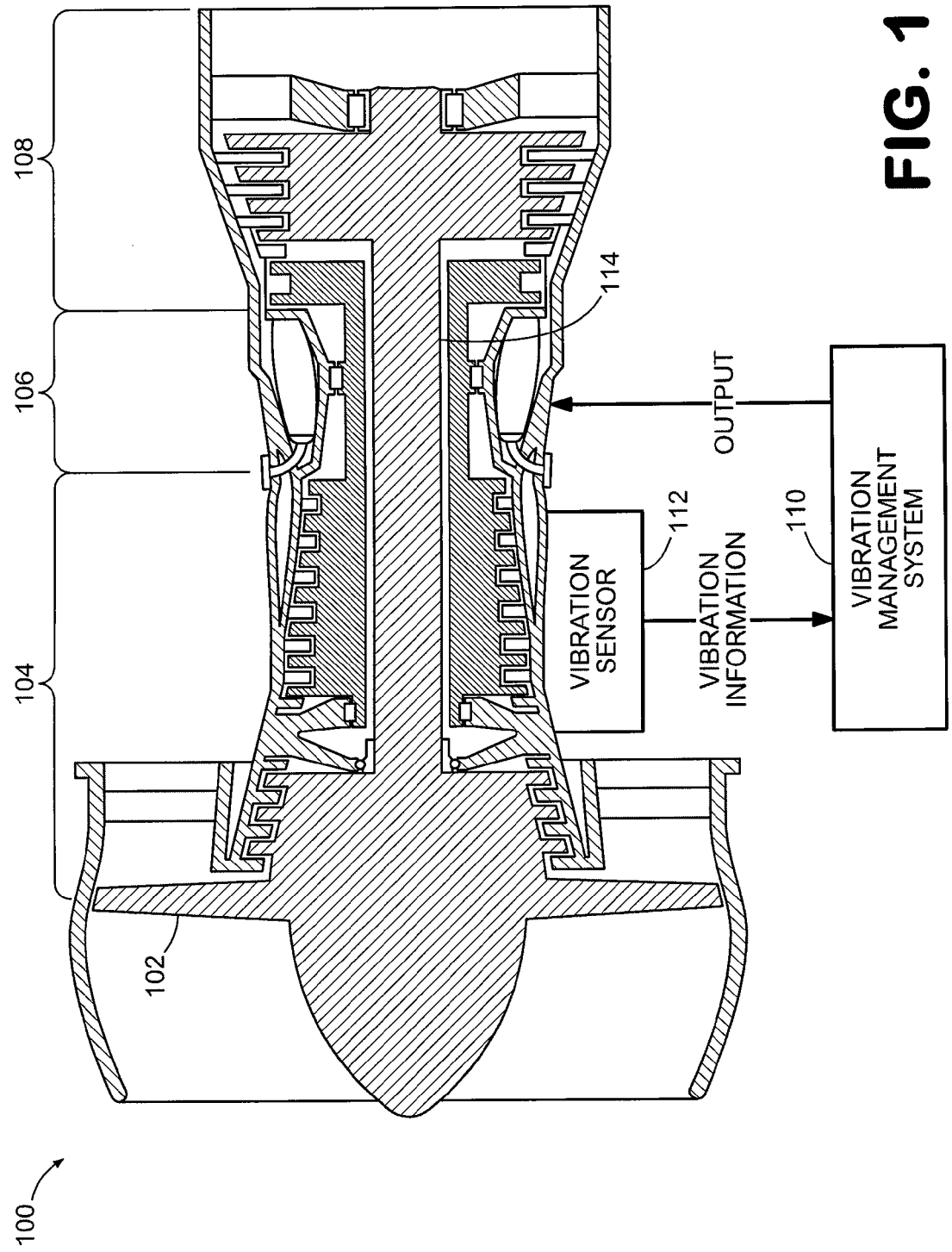
FIG. 1 is a schematic diagram depicting an embodiment of a gas turbine engine incorporating a vibration management system.

Referring now in detail to the drawings, FIG. 1 is a schematic diagram of an embodiment of a gas turbine engine that incorporates a vibration management system. As shown in FIG. 1, engine 100 incorporates a fan 102, a compressor section 104, a combustion section 106, and a turbine section 108. Although depicted in the embodiment of FIG. 1 as a turbofan, the invention is not limited to use with turbofans as use with other types of gas turbine engines is contemplated.

Engine 100 also includes a vibration management system 110 that receives input from a vibration sensor 112. Although only one vibration sensor is depicted in the embodiment of FIG. 1, other embodiments can incorporate additional vibration sensors. Notably, vibration sensor 112 is configured to sense vibrations associated with spool 114 that interconnects the compressor section and the turbine section.

In operation, information corresponding to a sensed vibration of the spool is provided from the vibration sensor to the vibration management system. The vibration management system evaluates the information and determines whether the sensed vibrations are within an acceptable predefined range of vibration limits. If the information indicates that the spool is vibrating excessively, the vibration management system attempts to reduce the vibrations by providing an output for adjusting operation of the gas turbine engine.

In this regard, one or more of various adjustments to the gas turbine engine can be facilitated, such as adjusting fuel flow to the combustion section, adjusting the angle of attack of one or more sets of variable vanes, and/or altering a throat area of a nozzle of the gas turbine. It should be noted that, in some embodiments, the vibration management system may attempt to reduce vibrations even if the sensed vibrations are within the predefined vibration limits.

Figure 2:
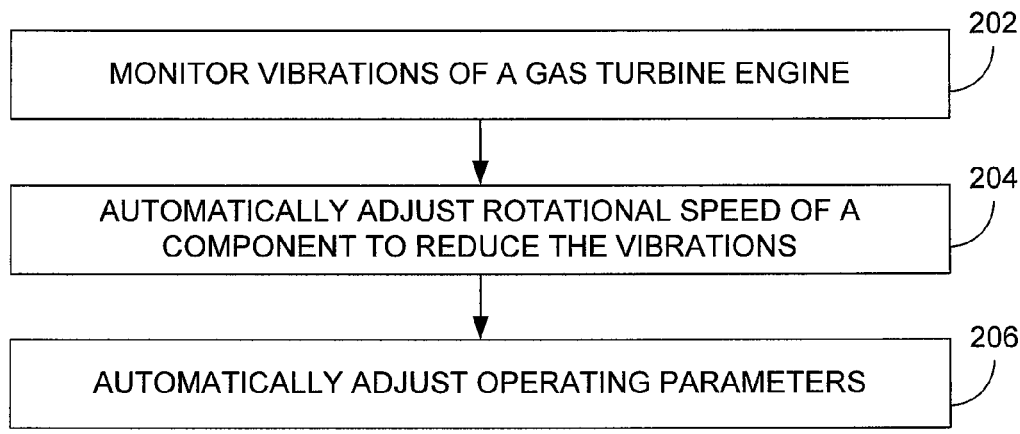
FIG. 2 is flowchart depicting functionality of an embodiment of a vibration management system.

Functionality of an embodiment of a vibration management system is depicted in the flowchart of FIG. 2. As shown in FIG. 2, the functionality of the (or method) may be construed as beginning in block 202, in which components of a gas turbine engine component are monitored for vibrations. In block 204, rotational speed of a component of the gas turbine engine is automatically adjusted in order to attempt to reduce the vibrations to within predefined vibration limits. In block 206, operating parameters of the gas turbine engine are automatically adjusted. In some embodiments, this is accomplished to maintain a relatively consistent level of thrust of the gas turbine engine through the use of an onboard engine performance algorithm. However, if that thrust level cannot be attained within normal engine operating limits, operating parameters can be adjusted to result in minimal engine thrust loss.

Figure 3:
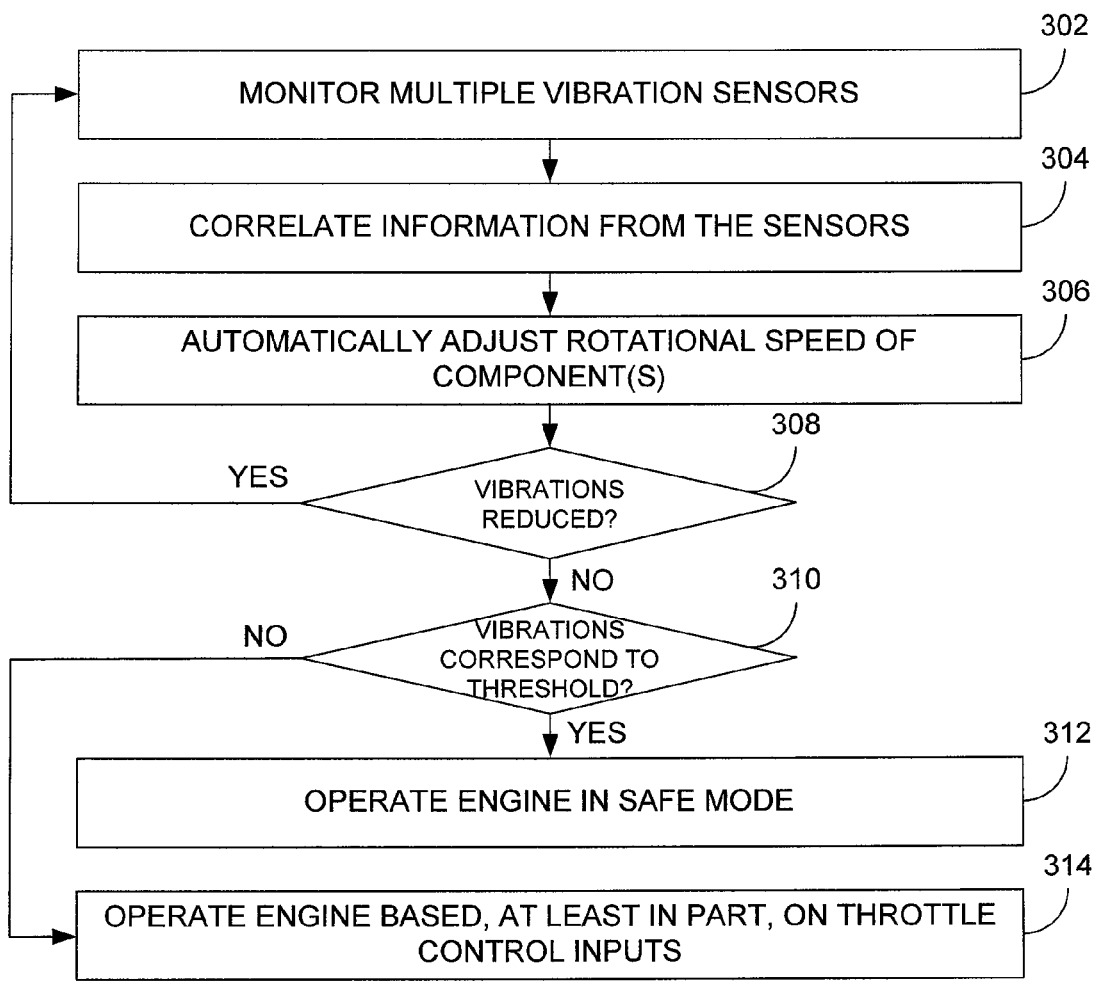
FIG. 3 is a flowchart depicting functionality of another embodiment of a vibration management system.

Functionality of another embodiment of a vibration management system is depicted in the flowchart of FIG. 3. As shown in FIG. 3, the functionality (or method) may be construed as beginning in block 302, in which multiple vibration sensors are monitored. In block 304, information from the sensors is correlated to determine which, if any, components of the gas turbine engine is vibrating excessively. In block 306, rotational speed of a component (e.g., an excessively vibrating component) is automatically adjusted based, at least in part, on the information an attempt to reduce the sensed vibrations. By way of example, the fuel flow to the combustion section of the gas turbine engine can be adjusted in order to reduce rotational speed of the component. Notably, operating parameters of the engine can be adjusted, in some embodiments, to maintain thrust of the engine even though rotational speed of one or more components is being altered. Notably, an onboard thrust calculation algorithm can be used to adjust fan inlet variable vanes, compressor variable vanes and/or nozzle throat area, for example.

As depicted in block 308, a determination is made as to whether the vibrations have been adequately reduced by the corresponding adjustment in rotational speed of the component. If it is determined that an adequate reduction in vibrations has been achieved, the process can return to block 302 and proceed as previously described. If, however, it is determined that the vibrations have not been adequately reduced, the process can proceed to block 310.

In block 310, a determination is made as to whether the vibrations correspond to a threshold level. If it is determined that the vibrations do not correspond to (e.g., do not exceed) the threshold level, the gas turbine engine is operated based, at least in part, on throttle control inputs (block 314). That is, the pilot retains the ability to override the rotational speed instructions provided by the vibration management system that could otherwise be calling for a reduction in rotational speed. In some embodiments, notification of the sensed vibrations, including an indication of the affected component(s), can be provided to the pilot. Thus, despite the presence of undesired vibrations, the vibrations are not considered so excessive as to require significant restrictions on engine performance.

However, if it is determined that the vibrations do correspond to, e.g., exceed, the threshold level, the gas turbine engine can be operated in a safe mode as depicted in block 312. In the safe mode of operation, thrust of the gas turbine engine can be reduced. By way of example, depending upon the severity of the vibrations, the thrust can be reduced to a minimum level that provides for safety of flight.

Figure 4:
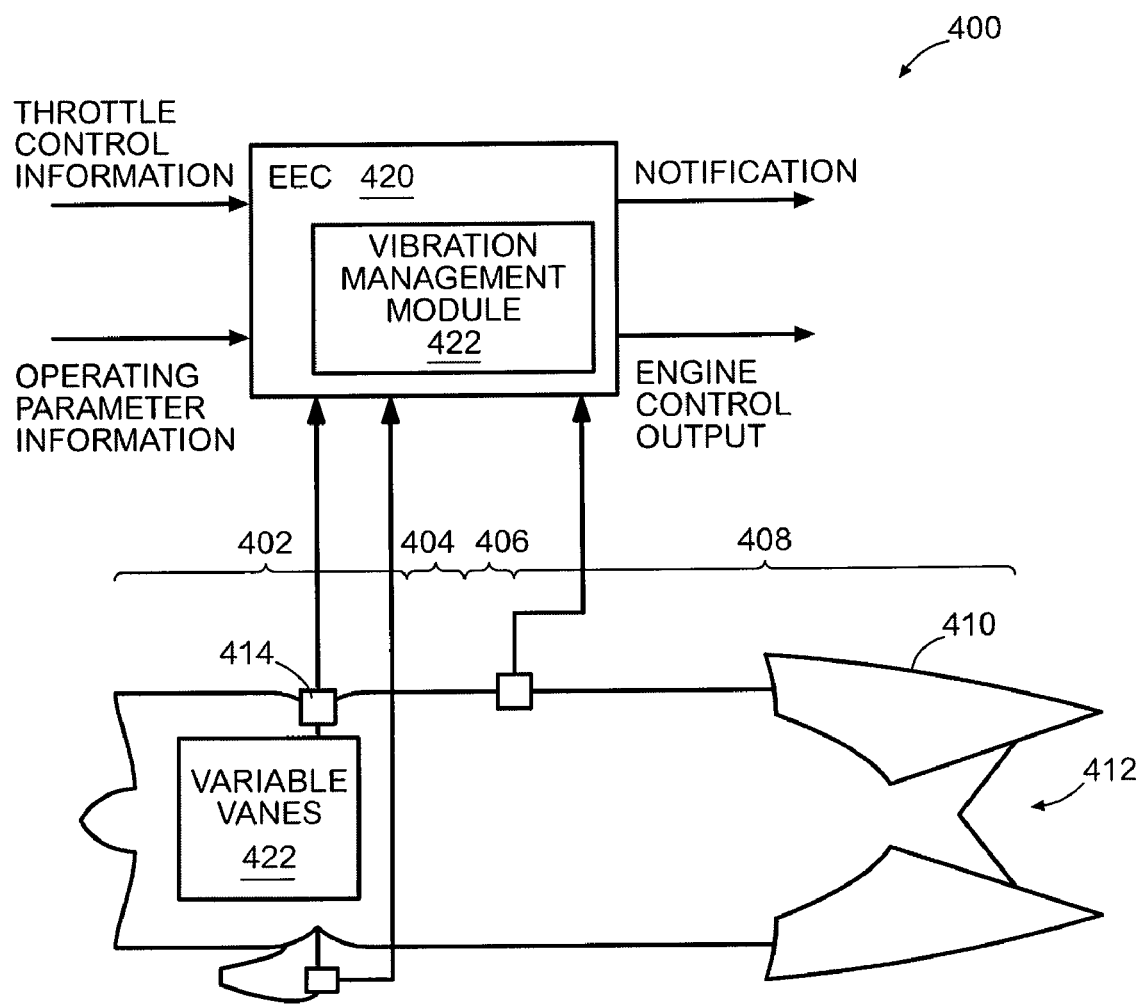
FIG. 4 is a schematic diagram depicting another embodiment of a gas turbine engine incorporating a vibration management system.

Another embodiment of a gas turbine engine that incorporates a vibration management system is depicted schematically in FIG. 4. As shown in FIG. 4, engine 400 incorporates a compressor section 402 (which includes variable vanes 403), a combustion section 404, a turbine section 406, an augmentor duct 408 and a nozzle 410. The nozzle is adjustable to control a throat area 412. Notably, multiple vibration sensors, e.g., sensor 414, also are provided that are positioned to monitor for vibrations.

Engine 400 also includes an electronic engine control (EEC) 420 (e.g., a full-authority digital engine control (FADEC)) that incorporates a vibration management module 422. In operation, EEC 420 receives various inputs, including throttle control inputs and engine operating parameter information and, in response thereto, provides outputs for controlling the engine.

The vibration management module 422 receives information corresponding to sensed vibrations from the vibration sensors. Using the information, the vibration management module determines whether the vibrations of the gas turbine exceed predefined vibration limits. If the vibrations exceed the predefined vibration limits, the vibration management module enables the EEC 420 to alter a rotational speed of a component in order to attempt to reduce the vibrations to within the predefined vibration limits.

In order to alter the rotational speed of a component, one or more of various adjustments to the gas turbine engine can be facilitated by the EEC. By way of example, the EEC can adjust fuel flow to the combustion section, adjust the angle of attack of one or more sets of variable vanes (e.g., vanes 403), alter a throat area 412 of the nozzle and/or adjust any other control effector(s) that could change rotational speed of any rotating component(s) of the engine.

In some embodiments, an EEC can attempt to maintain thrust of the engine even though rotational speed of a component is being altered. That is, such an EEC can attempt to maintain thrust at a level corresponding to the throttle control inputs even though operating parameters are being adjusted to alter rotational speed of one or more components in order to reduce vibrations.

In some embodiments, if an EEC is unable to adequately reduce vibrations, a safe mode can be actuated in which the thrust of the engine is reduced. By way of example the thrust can be reduced until the vibrations are within the predefined vibration limits. However, if the thrust reduction fails to establish the vibrations within the predefined limits, thrust can be further reduced toward that which is required for safety of flight. This is known as the safe mode of operation. For instance, thrust required for safety of flight can be which enables an aircraft to which the gas turbine engine is mounted to reach a suitable landing site. In other words, safety of flight (e.g., safe limit") thrust levels are greater than zero thrust.

In some of these embodiments, however, operation in the safe mode may be overridden. By way of example, operational necessity may require that a gas turbine engine be operated at a thrust level that results in excessive vibrations. In some of these embodiments, throttle control inputs can be used to set the thrust level regardless of the resultant vibrations. Therefore, in some embodiments, a safe mode of operation could be set and later overridden.

In some embodiments, information corresponding to engine vibrations can be stored and/or reported. By way of example, one or more of the pilot and/or a ground site (e.g., ground maintenance personnel) can be notified about sensed vibrations. Such notification could occur using wired and/or wireless communication. In some embodiments, the use of wireless communication can facilitate reporting of vibrations to a ground site prior to maintenance personnel having physical access to the aircraft, such as during flight.

It should be noted that various functionality, such as that described above in the flowcharts, can be implemented in hardware and/or software. With respect to software, each block of the flowcharts can be interpreted to represent a module, segment, or portion of code, which comprises one or more executable instructions for implementing the specified logical functions. It should also be noted that, in some alternative implementations, the functions noted in the blocks may occur out of order and/or not at all. For example, two blocks shown in succession may in fact be executed substantially concurrently or the blocks may sometimes be executed in the reverse order, depending upon the functionality involved.

One should also note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method for providing vibration management of a gas turbine engine comprising: detecting vibrations of a gas turbine engine; automatically adjusting rotational speed of a component of the gas turbine engine in order to attempt to reduce the vibrations to within predefined vibration limits; automatically adjusting operating parameters of the gas turbine engine such that, if the vibrations are reduced to within the predefined vibration limits, thrust of the gas turbine engine is set to an amount of thrust corresponding to the amount of thrust provided prior to the adjusting of the rotational speed of the component; and wherein, responsive to determining that adjusting the rotational speed of the component has failed to reduce the vibrations to within the predefined vibration limits, reducing thrust to a level above a safe limit.

2. The method of claim 1, wherein adjusting the rotational speed comprises reducing the rotational speed.

3. The method of claim 1, wherein adjusting the rotational speed of the component comprises adjusting fuel flow to a combustion section of the gas turbine engine.

4. The method of claim 1, wherein adjusting the rotational speed of the component comprises adjusting an angle of attack of at least one set of variable vanes of the gas turbine engine.

5. The method of claim 1, wherein adjusting the rotational speed of the component comprises adjusting a nozzle throat area of the gas turbine engine.

6. The method of claim 1, further comprising providing a notification indicative of the failure to reduce the vibrations to within the predefined vibration limits.

7. The method of claim 6, wherein the notification is provided to a cockpit of an aircraft to which the gas turbine engine is mounted.

8. The method of claim 1, further comprising enabling the reducing of the thrust to be overridden.

9. A gas turbine engine comprising:
a vibration sensor operative to provide information corresponding to a sensed vibration of the gas turbine engine; and
a vibration management system operative to receive the information from the vibration sensor such that, responsive to determining that vibrations exceed predefined vibration limits, the vibration management system is operative to alter rotational speed of a component of the gas turbine engine in order to reduce the vibrations to within the predefined vibration limits while a thrust of the gas turbine engine is set to an amount of thrust corresponding to the amount of thrust provided prior to the altering of the rotational speed of the component and, wherein, responsive to determining that adjusting the rotational speed of the component has failed to reduce the vibrations to within the predefined vibration limits, the engine is operative to reduce thrust to a level above a safe limit.

10. The gas turbine engine of claim 9, wherein:
the engine further comprises multiple vibration sensors, each of which is operative to provide information corresponding to a sensed vibration of the gas turbine engine; and
the vibration sensor is a first of the multiple vibration sensors.

11. The gas turbine engine of claim 9, wherein:
the engine further comprises a combustion section; and
the vibration management system is operative to alter rotational speed of a component of the gas turbine engine by reducing fuel flow to the combustion section.

12. The gas turbine engine of claim 9, wherein the engine is a turbofan engine.

13. The gas turbine engine of claim 9, wherein the engine further comprises an electronic engine control operative to receive inputs corresponding to operating parameters of the gas turbine engine and alter the operating parameters based, at least in part, upon thrust requirements for safety of flight.

14. The gas turbine engine of claim 9, wherein the component is a spool.

15. The electronic control of claim 9 wherein said vibration management module is further operative to reduce thrust to a safe level above zero thrust if reducing thrust above a safe limit fails to reduce the vibrations to within the predefined vibration limits.

16. An electronic control for a gas turbine engine comprising:
a vibration management module operative to:

receive information corresponding to vibrations of a gas turbine engine;

determine, from the information, whether the vibrations of the gas turbine exceed predefined vibration limits;

responsive to determining that the vibrations exceed the predefined vibration limits, provide an output for altering rotational speed of at least one component of the gas turbine engine in order to reduce the vibrations to within the predefined vibration limits while a thrust of the gas turbine engine is set to an amount of thrust corresponding to the amount of thrust provided prior to the altering of the rotational speed of the component and wherein, responsive to determining that adjusting the rotational speed of the component has failed to reduce the vibrations to within the predefined vibration limits, the electronic engine control is further operative to reduce thrust to a level above a safe limit.

17. The electronic control of claim 16 wherein said vibration management module is further operative to reduce thrust to a safe level above zero thrust if reducing thrust above a safe limit fails to reduce the vibrations to within the predefined vibration limits.

* * * * *